United States Patent [19]

Rydberg

[11] 4,196,640
[45] Apr. 8, 1980

[54] BELT TRANSMISSION AND ASSOCIATED BELT PULLEY AND BELT

[75] Inventor: Sverker Rydberg, Mantorp, Sweden

[73] Assignee: Innovest, Roland Lans AB, Upplands Väsby, Sweden

[21] Appl. No.: 828,834

[22] Filed: Aug. 29, 1977

[30] Foreign Application Priority Data

Sep. 1, 1976 [SE] Sweden .................................. 7609629
Sep. 1, 1976 [SE] Sweden .................................. 7609630

[51] Int. Cl.² ............................................. F16H 55/36
[52] U.S. Cl. ..................................... 74/230.5; 74/229; 74/231 R
[58] Field of Search ................... 74/230.5, 231 R, 229

[56] References Cited

U.S. PATENT DOCUMENTS 3,365,967   1/1968   Moogk ........................ 74/230.17 C Primary Examiner—Edward G. Favors Attorney, Agent, or Firm—Neil F. Markva

[57] ABSTRACT

A belt drive transmission comprises a plurality of belt pulleys over which passes at least one stretched drive belt composed of elastomeric material and having a substantially rectangular cross-section. At least one of the pulleys, especially a relatively small diameter drive pulley, has a belt-receiving peripheral groove of which the main side portions lie at different angles to a plane perpendicular to the axis of the pulley. The bottom of the groove is formed with a radially inwards convergent channel of which the width at the widest part is substantially equal to the width of the narrower edge of the belt while the depth of said channel is at least as great as the width of the narrower edge of the belt. In a stationary non-driving condition the belt lies against the main side portion of the groove which is at the greater angle to said plane perpendicular to the pulley axis, but under driving conditions at speed the belt moves into said channel.

27 Claims, 8 Drawing Figures

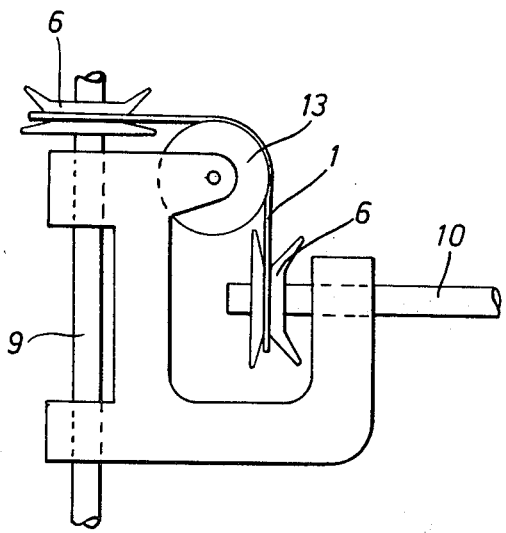
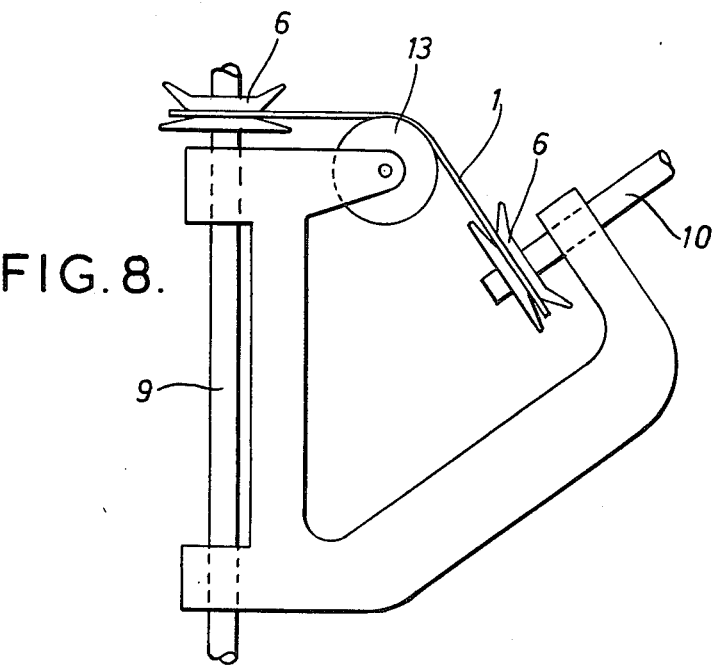

4,196,640

BELT TRANSMISSION AND ASSOCIATED BELT PULLEY AND BELT

FIELD OF INVENTION

This invention relates to belt transmission assemblies. More particularly, the invention relates to the configuration of an asymmetrical groove and a pulley used in combination with a flat belt member.

BACKGROUND OF THE INVENTION

Flat belts, V-belts and round belts have previously often been used for transmission of motion between shafts which are not co-axial, particularly those which are at some distance from one another and are parallel. All of these types of belts function fairly successfully as long as they are used with belt pulleys operating at moderate speeds. At higher speeds, flat belts are the first to become unsuitable as they begin to slip at relatively low speeds if the diameter of one of the pulleys is small in relation to the other and the separation of the shafts is relatively small.

It is generally considered better to use V-belts with V-grooved pulleys. However, V-belts begin to slip and burn due to the heat generated by friction if the pulley speeds exceed certain values. The danger of frictional burning is enhanced particularly where the driving pulley is smaller in diameter than the other pulley of a belt transmission assembly. The use of round belts always requires peripherally grooved pulleys. However, round belts are only used with very low speeds and at low powers.

Difficulties are particularly experienced when a large pulley is to be driven at a short distance from a smaller pulley and at high or extremely high speeds of revolution. It has been found that belts having flat, V-shaped and circular cross sections have a very short life under such working conditions. That is, these belts slip during the starting of the assembly and will be burned by the heat generated from the slippage. This type of difficulty has been particularly prevalent in electrically driven sewing machines being used commercially. In this instance, the worklife of the belts has been as short as a few days.

An increase in the belt tension is difficult to achieve under such conditions because it causes an increased load on the bearings. Consequently, there is increased risk of seizing or ball breakage in the bearings. Additionally, the increase in the belt tension will only help to overcome this slippage within a very narrow band of values.

SUMMARY OF THE INVENTION

The primary object of this invention is to overcome the difficulties of the prior art by using a specially designed belt pulley in combination with a particularly shaped flat belt.

It is a further object of the invention to provide a transmission assembly having two pulleys and a belt wherein the pulleys are rotatably mounted on shafts which are disposed at an angle with respect to each other.

The pulley device of this invention has a circumferential groove with an asymmetric cross section. The groove is located along the periphery of the pulley device and includes first and second lateral faces and an annular channel. The annular channel defines the bottom of the groove and has opposite sides which converge toward the center of the groove. The first and second lateral faces converge with respect to each other and terminate at the opposite sides of the annular channel. Each of the lateral faces are disposed at different angles with respect to a plane normal to the axis of the pulley device. A flat drive belt is used in combination with the pulley device. The drive belt has a generally rectangular cross section having one long side that is at least 0.5 times larger than the short side of the cross section. The belt is composed of a nonreinforced plastic rubber material. This belt has a considerable elastic extension imparted during fitting over the pulleys upon the construction of the transmission assembly. The particular construction of the pulley and belt enables the production of a low-cost and quiet angled transmission assembly.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 7 is an elevational view of a transmission assembly having two drive shafts disposed at 90° with respect to each other; and FIG. 8 is an elevational view of a transmission assembly wherein the drive shafts are disposed at an angle of 45° with respect to each other.

DETAILED DESCRIPTION

Figure 1:
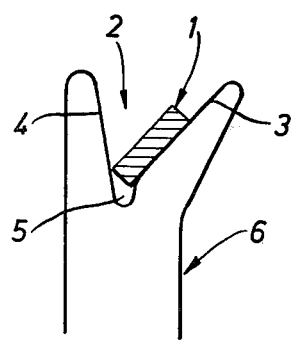
FIG. 1 is a fragmentary radial cross section through a belt transmission assembly made in accordance with this invention in an unloaded condition and stationary or at a low circumferential speed.
Figure 2:
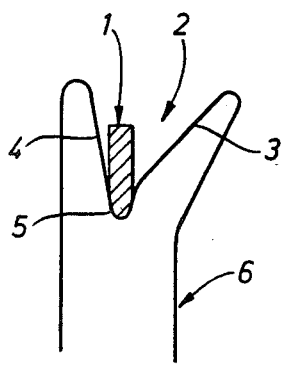
FIG. 2 is a fragmentary radial cross section of the assembly of FIG. 1 with the belt stretched and the pulley operating at a high circumferential speed.

Referring to FIGS. 1 and 2, a belt pulley 6 has at least one groove 2 located along its periphery. Groove 2 includes first and second lateral faces 3 and 4 and an annular channel 5 which defines the bottom of groove 2. Lateral faces 3 and 4 converge with respect to each other and terminate on opposite sides of the annular channel 5. As shown, each of the lateral faces are disposed at different angles with respect to a plane normal to the axis of pulley 6. Annular channel 5 has opposite sides which converge toward the center of groove 2. Thus, the profile of channel 5 may be V-shaped or rounded and reduces in width toward the center of pulley 6. One of the lateral faces 4 is coextensive with one of the sides of annular channel 5.

Lateral faces 3 and 4 diverge outwardly from the center of pulley 6 with lateral face 4 lying at a relatively small angle and the other lateral face 3 lying at a relatively large angle with respect to a plane normal to the axis of pulley 6. Lateral face 4 is generally disposed at an angle in the range of from 2° to 20° with respect to the plane normal to the axis of the pulley 6. In this specific embodiment, lateral face 4 is disposed at an angle of 5° with respect to the normal plane. The other lateral face 3 is generally disposed at an angle in the range from 30° to 80° with respect to the normal plane. In this specific embodiment, lateral face 3 is disposed at an angle of at least 60° with respect to the normal plane. Each of the lateral faces 3 and 4 is connected to a respective side of annular channel 5 with a smooth transition.

The depth of channel 5 is at least equally as large as the channel width at its widest point. In this particular embodiment, the annular channel includes a rounded bottom in cross section. It may also be acutely angled in cross section. That is, the bottom of channel 5 may be formed as an acute angle in cross section. The opposite sides of channel 5 are disposed at equal angles with respect to each other. The equal angles are not greater than 15° with respect to a plane normal to the axis of pulley 6.

The drive belt 1 has a generally rectangular cross section having one long side that is at least 0.5 times larger than the short side of the cross section. Belt 1 is composed of a nonreinforced elastic rubber material. The width of the short side is generally equal to the widest dimension of channel 5. The long side of the cross section is from 1.5 to 3 times larger than the width of the short side of the cross section. It may be larger than this but in no case will the long side of cross section be greater than 6.0 times larger than the width of the short side of the cross section. The width of belt 1 is not greater than the width of the lateral face 3 which is disposed at the greater angle with respect to the plane normal to the axis of pulley 6. The length of belt 1 should be considerably less than the length of a string which can be passed around to pulleys 6 forming a part of a transmission assembly with the string occupying the bottom of channel 5 in each of the pulleys 6. See the disposition of pulleys in the transmission assemblies of FIGS. 7 and 8.

Unexpectedly, belt 1 is disposed in a position as shown in FIG. 1 when pulley 6 is stationary. As the circumferential speed of pulley 6 is increased, and particularly when it is loaded, belt 1 is raised and approaches closer and closer to the position shown in FIG. 2. That is, the position of the belt 1 as shown in FIG. 2 is approached as the circumferential speed and the load on the assembly are increased. During this movement, the edge of belt 1 will creep down into channel 5 and operate without slipping.

With the belt 1 lying flat against lateral face 3 as shown in FIG. 1, no slipping will occur between the belt 1 and pulley 6 during starting of the assembly. That is, the operation of the assembly will be smooth and free from jerking due to the belt being made from nonreinforced elastic rubber material and its disposition on the pulley.

Figure 3:
FIG. 3 is a plan view of one of the forms of a driving belt made in accordance with the invention.
Figure 4:
FIG. 4 is a sectional view along line IV—IV of FIG. 3.

Belt 1 may be manufactured very easily in a shape as shown in FIGS. 3 and 4. As shown, belt 1 may be pressed out of a sheet of elastic rubber material having a thickness suitable for the width of channel 5 as discussed above. Belt 1 includes two straight parallel sections 7 and hairpin-bend sections 8 disposed at the ends of the belt interconnecting the two straight parallel sections 7. The belt has a considerably elastic extension and parted during fitting over any pulleys forming a transmission assembly. Consequently, there is generally no need for a separate belt tensioner to be used in a transmission assembly. Since the belt is manufactured from a nonreinforced elastic rubber material, it is possible to start the transmission assembly under full load. The hairpin-bend sections 8 have substantially terminated any tendency for the belt 1 to slip each time one of the sections 8 passes around the pulley 6. The lateral faces 3 and 4 have a width that is at least 1.5 times as large as the width of the channel 5 at its widest point. This gives the amount of space or area necessary to receive the long side of belt 1 as shown in FIG. 1.

The angled transmission drives as shown in FIGS. 7 and 8 may be established having the two shafts with crossing axes 9 and 10 disposed at an angle with respect to each other. As shown, two belt pulleys 6 and at least one belt 1 passes over these pulleys. One of the pulleys has a circumferential groove 2 as shown and discussed above. In the embodiment of FIG. 7, the shafts 9 and 10 are disposed at 90° with respect to each other. In the embodiment of FIG. 8, the shafts 9 and 10 are disposed at 45° with respect to each other. Belt 1 is fitted over pulley 6 with a long side of its cross section being disposed initially contiguous to the lateral face which is disposed at the greater angle with respect to the plane normal to the axis of rotation in each instance. The belt is effective to move its short side into the annular channel of pulley 6 upon rotation of these pulleys as discussed above. At least one of the pulleys 6 has lateral faces that are fixed with respect to each other. A belt of the configuration as shown in FIG. 3 may be used with the assemblies of FIGS. 7 and 8, wherein the long sides of the rectangular cross section of the belt 1 are disposed within two parallel planes which are spaced by a distance equal to the length of the short sides of the rectangular cross section. Where one of the pulleys has a smaller diameter than the other pulley, the configuration of the groove made in accordance with this invention is located around at least the smaller diameter pulley.

Belt 1 made in accordance with this invention has functioned satisfactorily for both crossed or semi-crossed operation of the transmission assembly and when passing over guide pulleys which have smooth cylindrical surfaces, such as idler pulley 13 shown in FIGS. 7 and 8. When it is necessary to gear down a fast operating motor with a small pulley to a large pulley, it is advisable to equip only the small pulley with the special groove while a large pulley may have a flat surface along its circumferential periphery. The angled drives made in accordance with this invention have been found to be economical and practical. They have particularly been found to be advantageous from the standpoint of reduced noise in comparison with the use of transmission assemblies having bevel and worm gears.

Figure 5:
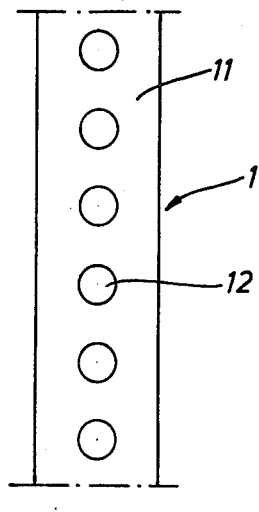
FIG. 5 is a fragmentary plan view of another embodiment of a belt made in accordance with this invention in the unstretched state.
Figure 6:
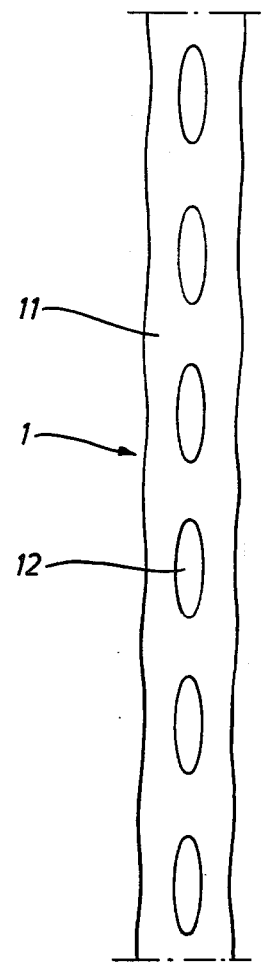
FIG. 6 is a plan view of the belt of FIG. 5 in the stretched state.

In some applications, the form of belt as shown in FIGS. 5 and 6 have become particularly advantageous. This form of construction is useful for thick belts and belts used at high speeds and high load capacities. Here, holes 12 having a diameter that is not greater than $\frac{1}{3}$ times the width of belt 1 are completely pierced through the long flat sides of the cross section. The distance between the centers of adjacent holes 12 along the long side of the cross section is at least 2.0 times as large as the diameter of holes 12. Flat sides 11 form the long sides of the rectangular cross section.

It is possible that the belt 1 may be made by injection molding or mold curing as is well known in the manufacture of prior art belts. While the specific embodiment shows a flat short side, it is also possible to form the belt with rounded edges.

While the Belt Transmission and Associated Belt Pulley and Belt have been shown and described in detail, it is obvious that this invention is not to be considered as being limited to the exact form disclosed, and that changes in detail and construction may be made therein within the scope of the invention, without departing from the spirit thereof.

I claim:

1. A pulley device having a circumferential groove with an asymmetric cross section, said device comprising:
   (a) the groove being located along the periphery of the device and including first and second lateral faces and an annular channel,
   (b) said annular channel defining the bottom of said groove, and
   (c) said first and second lateral faces converging with respect to each other and terminating on opposite sides of said annular channel,
   (d) said first and second lateral faces each being disposed at different angles with respect to a plane normal to the axis of the pulley device,
   (e) said annular channel having opposite sides which converge toward the center of the groove.

2. A pulley device as defined in claim 1 wherein one of the lateral faces is coextensive with one of the sides of the annular channel.

3. A pulley device as defined in claim 1 wherein the depth of the channel is at least equally as large as the channel width at its widest point.

4. A pulley device as defined in claim 1 wherein the annular channel includes a rounded bottom in cross section.

5. A pulley device as defined in claim 1 wherein the annular channel includes an acutely angled bottom in cross section.

6. A pulley device as defined in claim 1 wherein the lateral faces have a width that is at least 1.5 times as large as the width of the channel at its widest point.

7. A pulley device as defined in claim 1 wherein the opposite sides of the annular channel are disposed at equal angles with respect to each other, said equal angles being not greater than 15° with respect to a plane normal to the axis of the pulley device.

8. A pulley device as defined in claim 1 wherein one of the lateral faces is disposed at an angle of at least 60° with respect to a plane normal to the axis of the pulley device.

9. A pulley device as defined in claim 1 wherein one of the lateral faces is disposed at an angle in the range of from 2° to 20° with respect to a plane normal to the axis of the pulley device, and the other of the lateral faces is disposed at an angle in the range from 30° to 80° with respect to said normal plane.

10. A pulley device as defined in claim 9 wherein said one of the lateral faces is disposed at an angle of 5° with respect to said normal plane, and each said lateral face is connected to a respective side of the annular channel with a smooth transition.

11. A pulley device as defined in claim 1 wherein said pulley device comprises a pulley member having lateral faces that are fixed with respect to each other.

12. A drive belt comprising:
   (a) a generally rectangular cross section having long sides that are at least 0.5 times larger than the short sides of the cross section,
   (b) said belt being composed of a nonreinforced elastic rubber material.

13. A drive belt as defined in claim 12 wherein the long sides of the cross section are not greater than 6.0 times larger than said short sides.

14. A drive belt as defined in claim 13 wherein the long sides of the cross section are 1.5 to 3.0 times the size of said short side.

15. A drive belt as defined in claim 12 wherein holes are completely pierced through the flat long sides of the cross section.

16. A drive belt as defined in claim 15 wherein the holes have a diameter that is not greater than ⅓ times the width of the belt along the long sides of the cross section.

17. A drive belt as defined in claim 15 wherein the distance between the centers of adjacent holes along the long sides of the cross section is at least 2.0 times as large as the diameter of said holes.

18. A drive belt as defined in claim 12 wherein said belt is a continuous closed loop including two straight parallel sections having ends connected by hairpin-bend sections,
said long sides of said rectangular cross section being disposed within two parallel planes which are spaced at a distance equal to the length of the short sides of the rectangular cross section.

19. A transmission assembly comprising:
   (a) two belt pulleys and at least one belt passing over said pulleys,
   (b) said belt having a considerable elastic extension imparted during fitting over said pulleys and having a generally rectangular cross section with a long flat side and a short side,
   (c) one of said pulleys having a circumferential groove located along its periphery,
   (d) said groove including first and second lateral faces and an annular channel,
   (e) said annular channel defining the bottom of said groove and having opposing sides which converge with respect to each other,
   (f) said annular channel having its greatest width corresponding to said short side of the belt cross section and its depth at least equal to said greatest width,
   (g) said first and second lateral faces converging with respect to each other and terminating at the opposite sides of said channel,
   (h) one of said first and second lateral faces being disposed at greater angles with respect to a plane normal to the axis of the pulley than the other of said lateral faces.

20. The assembly as defined in claim 19 wherein said belt is composed of a nonreinforced elastic rubber material.

21. The assembly as defined in claim 19 wherein said opposing sides of the annular channel converge to the center of said groove.

22. The assembly as defined in claim 19 wherein the pulleys are rotatably mounted on shafts which are disposed at an angle with respect to each other.

23. The assembly as defined in claim 22 wherein said shafts are disposed at 45° with respect to each other.

24. The assembly as defined in claim 22 wherein said shafts are disposed at 90° with respect to each other.

25. The assembly as defined in claim 19 wherein said belt is fitted over said pulleys with a long side of its cross section being disposed initially contiguous to said lateral face disposed at said greater angle with respect to said normal plane, said belt being effective to move its short side into said annular channel upon rotation of said pulleys.

26. The assembly as defined in claim 19 wherein at least one of the pulleys has lateral faces that are fixed with respect to each other.

27. The assembly as defined in claim 19 wherein one of the pulleys has a smaller diameter than the other pulley, and said groove is located around at least the smaller diameter pulley.

* * * * *